United States Patent [19]

Maekawa et al.

[11] 3,867,174
[45] Feb. 18, 1975

[54] BATHS FOR ACTIVATING THE SURFACE OF PLASTICS TO BE CHEMICALLY METAL-PLATED

[75] Inventors: Hiroshi Maekawa, Osaka; Choji Yamauchi, Fuse, both of Japan

[73] Assignee: Giichi Okuno, Osaka-shi, Japan

[22] Filed: Feb. 13, 1970

[21] Appl. No.: 14,900

[30] Foreign Application Priority Data
Aug. 6, 1965 Japan.............................. 40-47912

[52] U.S. Cl................. 117/47 A, 106/1, 117/71 R, 117/138.80 A, 117/160 R, 156/2, 204/30
[51] Int. Cl......................... B44d 1/092, C23c 3/02
[58] Field of Search..... 117/47 A, 160 R, 138.80 A, 117/71 R; 106/1; 204/30; 156/2

[56] References Cited
UNITED STATES PATENTS
3,553,085   1/1971   Heymann............................. 156/2

Primary Examiner—William D. Martin
Assistant Examiner—Janyce A. Bell
Attorney, Agent, or Firm—Larson, Taylor and Hinds

[57] ABSTRACT

Activated polymer surface is prepared by contacting a clean non-active unconditioned polymer surface with a liquid activating composition containing at least one reactive conditioning agent in combination with at least an ion of a metal selected from the group consisting of platinum, palladium, silver and gold, wherein the reactive conditioning agent contains sulfuric acid and chromic acid. The polymer surface may contain acrylonitrile-butadiene-styrene terpolymer.

6 Claims, No Drawings

BATHS FOR ACTIVATING THE SURFACE OF PLASTICS TO BE CHEMICALLY METAL-PLATED

This application is a division of application Ser. No. 570,702 in the name of Maekaua, et al., filed Aug. 1, 1966 and now abandoned.

This invention relates to a process for motivating the surface of plastics which is to be chemically plated, particularly to an improved and useful process for activating the surface of plastics which is to receive electroless plating of copper or nickel as well as to the bath to be used for the purpose.

Plastics are currently used to a great extent, however with drawbacks such as deterioration by ultra-violet rays, electrification, and scarcity of surface hardness. Attempts have been made to metal-plate the surface of plastics with a view to elliminating these drawbacks and further developing new uses. It is impossible to directly electroplate plastics because of its nonelectroconductivity, so that the surface of plastics should first be activated by a preliminary chemical treatment, the activated surface then plated with copper or nickel by a chemical measure to turn electroconductive before an ordinary electroplating takes place. The said preliminary treatment for the activation is indispensable for metal-plating plastics, and the skill in the treatment materially affects the chemically plated metal layer and the final electroplated layer. If the preliminary treatment is insufficient the chemically plated metal layer is apt to be uneven and to peel off the surface of plastics, while by an excessive preliminary treatment objectionable rugged surface will be formed in the metal layer. The uneven or rugged surface of chemically plated metal layer impairs its adhesion to electroplated layer as well as reducing the luster and smoothness of the electroplated layer.

Various proposals have been made as to the method of preliminary treatment for the activation, such as being incapable of effecting sufficient activation or being troublesome and complicated in operation. For example, a preliminary treatment method which is extensively applied in the industry as bringing a satisfactory activation effect comprises dipping plastics to be plated in a mixture of chromic acid and sulphuric acid to turn the surface thereof wettable (etching) after roughing the surface as required by a tumbling or liquid-honing, and further dipping the etched plastics in hydrochloric acid solution of stannous chloride to cause it to adsorb stannous chloride on the surface (sensitizing), and then dipping in a solution containing inorganic salt of catalytic metals such as gold, silver, palladium, platinum, etc., to make the catalytic metal deposit on the surface of plastics (activation), with rinsing with water between successive processes.

This publicly known method, however, consists of 3-step processes, etching, sensitizing and activating, each of which is complicated, and if any of the processes or the rinsing between the processes happens to be unsatisfactory the surface of plastics can be unsatisfactorily activated. Thus, this publicly known method necessitates not only high expenditure for labor and treating liquid but also a sufficient skill and exquisite attention for each process. Attempts have been made also for simplifying the preliminary treatment all of which have so far failed to materialize without sacrificing the adhesive strength of metal-plated layer to plastics or luster of the metal-plated layer. One of them was to activate the surface of plastics by treating in an aqueous solution of catalytic metal such as palladium chloride containing stannous chloride after the said etching, but in this manner metal palladium may be precipitated in a relatively short time due to reduction by stannous chloride to make the bath unfit for further use, and furthermore, when the surface activated in this manner is chemically plated, partially non-metal-plated portions may occur on the surface, and insufficient adhesive strength of metal-plated layer to plastics results.

Accordingly, the object of the invention is to provide an improved and useful method of activation of the surface of plastics to be metal-plated which overcomes the aforementioned drawbacks of the conventional method of preliminary treatment for activating the plastics.

Another object of the invention is to provide a method which enables activation of the surface of plastics by a single treatment without preceding etching and sensitizing processes.

Still another object of the invention is to provide a method of activation of the surface of plastics by which high adhesive strength of plastics and the chemically plated metal layer which has smooth-surface is obtained despite the drastic simplification of the process, as well as satisfactory adhesion with the final electroplated layer.

The above and other objects of the invention will be apparent in the description to follow.

According to the invention, the surface of plastics is activated by treating it in a bath containing $H_2SO_4$ and catalytic metal ion or in a bath containing $H_2SO_4$, a chromium (VI) compound and catalytic metal ion.

The invention is based on the discoveries that the surface of plastics is easily activated by the said single-bath treatment and that the surface of plastics which is activated by the method of the invention, when further metal-plated in the conventional chemical copper or chemical nickel-plating bath, higher adhesion strength of the metal-plated layer and plastics than by the conventional method can be obtained with even and smooth-surfaced metal-plated layer, to bring, in the final electroplating, markedly excellent adhesive property with electroplated layer.

The catalytic metals used in the invention include such metals as silver, gold, platinum and palladium which are known for their catalytic action in a chemical copper or chemical nickel-plating bath. These catalytic metals can be added to the bath in the form of inorganic salt, oxide, hydroxide, etc., to be dissolved. The said compounds of the catalytic metals comprise silver oxide, silver nitrate, silver sulfate, silver chlorate, silver bichromate, silver bromide, silver fluoride, silver chloride, silver carbonate, gold chloride, gold sulfate, platinum chloride, palladium chloride, palladium sulfate, palladium hydroxide, etc.

When a bath containing $H_2SO_4$ and catalytic metal ion is employed, the concentration of $H_2SO_4$ should be within a range of 11.5000 – 18.4500 mol/l, and that lower than this range results in insufficient activation effect and weakens the adhesive property with chemical copper or chemical nickel plated layer, while the higher concentration makes the operation difficult by fuming of the acid. Desirable concentration of $H_2SO_4$ is in a range of 14.0000 – 18.4500 mol/l. The concentration of catalytic metal ion in the bath can vary in a wide range, sufficient amount of metal being 0.0003 mol/l for catalytic action. While the use of more amount is not harmful, and ensures higher catalytic activity, an excess amount will not bring better effect, so that it is desirable to limit it to less than 0.0800 mol/l in view of economy and solubility of the said metal compounds in sulphuric acid. A particularly desirable range, while it depends on the kinds of metals is generally 0.0010 – 0.0080 mol/l.

Where a bath containing $H_2SO_4$, chromium compound and catalytic metal ion is employed, $H_2SO_4$ in the bath should be within 5.4000 – 18.4500 mol/l, the preferrable concentration being 13.2500 – 15.0000 mol/l. The chromium (VI) compounds may comprise chromic acid, chromic acid anhydride, and alkali metal chromate or bichromate such as potassium chromate, sodium bichromate, potassium bichromate, etc. and the said compound is contained in the bath at the rate of 0.0060 – 0.4500 mol/l by the amount reduced to $CrO_3$, preferably 0.1000 – 0.1700 mol/l. The presence of the chromium compound accelerates more effectively the activation of the surface of plastics relative to the said $H_2SO_4$-metal ion bath, and the lesser amount of the compound loses such an effect, while the amount in excess leads to marked corrosion of the surface of plastics. The concentration of the catalytic metal is in a range as described above of 0.0003 – 0.8000 mol/l, preferrably 0.0010 – 0.0080.

To restrict the corrosive action on plastics, phosphoric acid can be added to either of the above baths at a concentration widely varying, and that of 0.8400 mol/l of $H_3PO_4$ is effective which is intensified with the increase of the concentration, but that in excess of 7.5000 mol/l results in diluting the bath without increasing anti-corrosive effect. Accordingly, the addition of phosphoric acid in the range of 0.8400 – 7.5000 mol/l, particularly 2.0000 – 3.7000 mol/l is desirable. For the bath of $H_2SO_4$ and catalytic metal ion to which phosphoric acid is added, a concentration of $H_2SO_4$ of 11.0000 – 18.4500 mol/l, particularly 13.5000 – 15.5000 mol/l and that of $H_3PO_4$ of 0.8400 – 7.3500 mol/l, particularly 1.6800 – 5.0000 mol/l respectively are desirable ranges, and for the bath of $H_2SO_4$, chromium compound and catalytic metal ion to which phosphoric acid is to be added the desirable ranges of concentration of the respective acids are: $H_2SO_4$: 5.10 – 14.14 mol/l, particularly 8.50 – 11.50 mol/l; $CrO_3$: 0.0060 – 0.5000 mol/l, particularly 0.1200 – 0.1650 mol/l; and $H_3PO_4$: 0.8400 – 7.5000 mol/l, particularly 1.6800 – 3.7000 mol/l.

Plastics which can be activated in these baths comprise various polymers such as acrylonitrile-butadiene-styrene copolymer (hereinafter referred to as "ABS resin"), acrylonitrile-styrene copolymer, polystyrol, polyester, polyethylene, polypropylene, polyurea, polycarbonate, etc., and these baths are particularly effective on ABS resin. These plastics may be employed in the form of various plastics moldings such as the parts of television and radio sets, sweeping machines, refrigerators and other electrical appliances, including, for example, cabinets and knobs for television and radio sets, meters, doors and handles for automobiles, parts of typewriters, telephones and other office machines, buttons, beads, broaches, etc. According to the invention the surfaces of any complicated forms of moldings can be uniformly activated. The plastics except ABS resin may be desirably subjected to the conventional roughing process preceding to the activation process of the invention.

The activation treatment of the invention is carried out by dipping the plastics as abovementioned in the said baths. 10° – 80° C. is a generally used temperature for the baths, and desirably 30° –60° C. The dipping time varies according to the composition of the bath, treating temperature, the nature of plastics to be activated and other factors, but should be sufficient to activate the surface of plastics, generally for 1 – 30 min. or so, desirably 10 – 15 min. By this treatment hydrophilic groups such as $-SO_3H$, $-COOH$, and $-OH$ are introduced to the surface of plastics and the catalytic metal ion is adsorbed thereto, thus the surfaces turn wettable with water and is highly activated. The catalytic metal ion is adsorbed strongly to the surface of plastics, so that the activity of the surface of the plastics is not lost by repeated washing with water or by leaving it for a long period of time.

The plastics activated according to the invention is then washed with water, generally with running water, and dried as required, after which it is dipped in a chemical copper bath or a chemical nickel bath in the conventional manner for metal-plating. As the surface of the plastics treated according to the invention is activated to a markedly higher extent as compared with the publicly known method, the resultant chemically plated metal layer becomes strongly adhesive to plastics, and has uniform and smooth surface, assuring an excellent adhesive property of the chemically plated layer and electroplated layer. The chemical copper or chemical nickel bath used in the invention may be the conventional one which contains a water-soluble inorganic salt of copper (II) or nickel (II), complexing agent, reducing agent and alkaline or acidic substance, and the plastics activated according to the invention can be simply metal-plated in these publicly known baths. In the conventional metal-plating method, the plastics activated according to the invention is merely dipped in the metal-plating bath at 10° – 95° C., particularly 15° – 65° C. for 1 – 20 min. Among the catalytic metals palladium exhibits a sufficient catalytic action for all the metal-plating baths in which a reducing agent is used such as alkali metal salt of hypophosphorous acid, formaline or sodium boro-hydride whereas gold, silver and platinum are not so effective for the nickel-plating bath in which an alkali metal salt of hypophosphorous acid or sodium boro-hydride is used as a reducing agent and are effective only for the copper-plating bath containing formaline as a reducing agent.

The chemically metal-plated plastics is electroplated by the conventional method of the desired thickness. The plastics activated according to the invention has excellent adhesive property with the chemically plated layer and further provides excellent adhesion of chemically metal-plated and electroplated layers with smooth, uniform and beautiful finish of the latter.

For better understanding of the invention examples will be given hereinafter, wherein the peeling test and heating and cooling test to measure the adhesive strength were carried out in the following manner:

Peeling Test

Over the entire length of electroplated surface of the sample two parallel lines 1 cm apart were cut so deep as to reach the surface of the plastics and one end of the electroplated layer cut 1 cm wide was stripped off and pulled at an angle of 90° at the rate of 3 cm/min and the force required (kg/cm) was sought.

Heating and Cooling Test 10 electroplated samples were heated at 105° C. for 2 hours, then left at 20° C. for 30 min., cooled at −29° C. for 2 hours, and again left at 20° C. for 30 min. The samples were subjected to three cycles of the above treatment, and the number of samples were sought, whose plated layer had blistered. The samples which showed blisters of electroplated layer by one cycle of treatment were excluded in the subsequent cycle.

EXAMPLE 1

Activation 1 liter of aqueous bath containing:

| | |
|---|---|
| $H_2SO_4$ | 1,650 g/l |
| $AgSO_4$ | 1.5 g/l |

ABS resin plates, 3 cm × 10 cm × 0.5 cm were dipped in the above bath at 25° C. for 3 min. and then washed with running water and dried at room temperature.

Chemical Plating 1 liter of aqueous bath containing:

| | |
|---|---|
| $CuSO_4.5H_2O$ | 50 g/l |
| $Na_2CO_3$ | 25 g/l |
| NaOH | 30 g/l |
| Rochelle salt | 150 g/l |
| 37 % Formaline | 100 ml/l |

The resin plates activated as above were dipped in the bath of the above composition at 25° C. for 10 min. for chemical plating and washed with water and dried at room temperature. The thickness of the plate layer was 0.4 μ with smooth surface free of pinholes.

Electroplating 1 liter of aqueous bath containing:

| | |
|---|---|
| $CuSO_4.5H_2O$ | 80 g/l |
| $H_2SO_4$ | 8 g/l |

The chemically plated resin plates were dipped in the above bath under cathode current density of 0.5 A/dm² at 25° C. for 5 min., and further dipped in 1 liter of aqueous bath containing:

| | |
|---|---|
| $CuSO_4.5H_2O$ | 250 g/l |
| "UBAC"(Udylite Corp. U.S.A., brightening agent) | 3 ml/l |
| $H_2SO_4$ | 30 g/l |

Under cathode current density of 3 – 5 A/dm² at 25° C. for 20 min. with air stirring for plating, and electroplated copper layer 20μ thick was obtained.

Then the resultant plates were dipped in the following bath under current density of 3 – 5 A/dm² at 50° C. for 12 min. with air stirring to form a nickel-plate layer 8 μ thick:

1 liter of aqueous bath containing:

| | |
|---|---|
| $NiSO_4.6H_2O$ | 280 g/l |
| $NiCl_2.6H_2O$ | 45 g/l |
| $H_3BO_3$ | 40 g/l |
| Butynediol | 0.01 g/l |
| Sodium 1,3,6-naphthalene trisulfonate | 1 g/l |

The above plates were further dipped in the following bath under current density of 20 A/dm² at 50° C. for about 1 min. with air stirring to form a chrome-plated layer 0.25 μ thick on the surface:

1 liter of aqueous bath containing:

| | |
|---|---|
| CrO | 250 g/l |
| $H_2SO_4$ | 2.5 g/l |
| $Cr^{+++}$ | 2 – 3 g/l |

The products finished as above had an electroplated layer with smooth surface and beautiful metallic luster, exhibiting markedly high adhesion between plated layer and plastics and between respective plated layers, and the minimum value of 1.5 kg/cm and maximum value of 4.5 kg/cm by the peeling test, and no blisters were found during three cycles of the heating and cooling test.

In the above method $Ag_2SO_4$ was substituted with $AuCl_2$ for the activating bath by which similar results were obtained.

By the conventional method of plating as following for comparison, the minimum value of 1.0 kg/cm and maximum value of 3.0 kg/cm by the peeling test were obtained while by the heating and cooling test blisters were observed in the second and third cycles of one sample each.

Comparative Example of Metal-plating 1 liter of aqueous bath containing:

| | |
|---|---|
| $H_2SO_4$ | 900 g/l |
| $H_3PO_4$ | 295 g/l |
| $K_2CO_2O_7$ | 25 g/l |

ABS resin plates same as those of Example 1 were dipped in the above bath at 65° C. for 15 min. for etching and then washed with water, and further dipped in 1 liter of aqueous bath containing:

| | |
|---|---|
| $SnCl_2$ | 15 g/l |
| 36 % Hydrochloric acid | 40 ml/l | at 20° C. for 3 min. for sensitizing, and then dipped in 1 liter of aqueous bath containing:

| | |
|---|---|
| $PdCl_2$ | 0.15 g/l |
| 36 % Hydrochloric acid | 7 ml/l | at 20° C. for 1 min. for activation. The plates thus activated were washed and dried with water, and further subjected to chemical copper plating and electroplating in the same manner as Example 1.

EXAMPLE 2

Styrene resin plates, 3 cm × 19 cm × 0.5 cm had the surfaces roughened by blasting a mixture of emery powder, 400 mesh and water in the 5:1 (by weight) under air pressure of 4 kg/cm², then were dipped in 1 liter of aqueous bath containing:

| | |
|---|---|
| $H_2SO_4$ | 1,200 g/l |
| $H_3PO_4$ | 90 g/l |
| $K_2CR_2O_7$ | 18 g/l |
| $PdSO_4$ | 1.2 g/l | at 45° C. for 5 min. for activation, and then washed with water and dried at room temperature.

The above plates were dipped in the following bath at 65° C. for 5 min., then washed with water and dried:

1 liter of aqueous bath containing:

| | |
|---|---|
| $NiCl_2 6H_2O$ | 20 g/l |
| $Na(H_2PO_2)$ | 27 g/l |
| Sodium succinate | 16 g/l |

The chemically plated nickel layer as above had a thickness of 0.8 μ with smooth surface free of pinholes.

The above plates were further electroplated in the manner same as Example 1, and the resultant electroplated layer exhibited smooth surface and beautiful metallic luster, showing 0.23 kg/cm by the peeling test, and none of the samples showed any blisters throughout three cycles of the heating and cooling test.

In the above treatment the chemical nickel-plating bath was replaced by the chemical copper plating bath of Example 1 with subsequent electroplating same as above, and substantially similar results were obtained.

For comparison, the styrol plates same as those of this Example were subjected to the conventional etching, sensitizing and activation as mentioned in Example 1, and then chemically nickel-plated and electroplated as in Example 2, and the resultant products exhibited a value of only 0.12 kg/cm by the peeling test and by the heating and cooling test blisters occured in the second and third cycles of one sample each.

EXAMPLE 3

ABS resin plates, 3 cm × 10 cm × 0.5 cm as mentioned in Example 1, were dipped in the following bath at 50° C. for 15 min. for activation, washed with water and dried, followed by the chemical copper plating and further by electroplating of Example 1 respectively.

The resultant products exhibited the electroplated layer with smooth surface and beautiful metallic luster, showing a minimum value of 1.5 kg/cm by the peeling test, and no blisters of the plated layer throughout three cycles of the heating and cooling tests.

EXAMPLE 4

The surfaces of polypropylene radio knobs were roughened in the same manner as Example 2, and dipped in the following bath at 80° C. for 20 minutes for activation and then subjected to the chemical nickel-plating of Example 2 and subsequent electroplating of Example 1:

1 liter of aqueous bath containing:

| | |
|---|---|
| $H_2SO_4$ | 1,170 g/l |
| $H_3PO_4$ | 230 g/l |
| $CrO_3$ | 34 g/l |
| PdO | 1.5 g/l |

The knobs thus treated had an entire electroplated layer 35 μ thick with beautiful nickel luster, free of pinholes, and none of the samples showed blisters in plated layer after three cycles of the heating and cooling test.

For comparison the polypropylene radio knobs same as above were roughened in the similar manner, and then subjected to the conventional etching, sensitizing and activating treatments as mentioned in Example 1, and further to the chemical nickel-plating and electroplating of Example 4. By the heating and cooling test of the resultant samples blisters occured in the second and third cycles of one sample each.

EXAMPLE 5

The surfaces of polycarbonate resin transistorized radio cabinets were roughened in the manner of Example 2 and then dipped in the following bath at 60° C. for 20 min., washed with water and dried and further subjected to the chemical copper-plating and electroplating of Example 1:

1 liter of aqueous bath containing:

| | |
|---|---|
| $H_2SO_4$ | 1,810 g/l |
| $Ag_2O$ | 1.5 g/l |

The treated cabinets had an electroplated layer with smooth surface and beautiful metallic luster, and a blisters of one sample occured in the second cycle of heating and cooling test.

For comparison the cabinets same as above had the surface roughened similarly, and further subjected to the conventional etching, sensitizing and activating treatments of Example 1, and to subsequent chemical copper-plating and electroplating of this Example. By the heating and cooling test of the resultant samples a blister occured of one sample in the first cycle, two in the second and one in the third.

EXAMPLE 6

Urea resin buttons whose surfaces were roughened in the same manner as Example 2 were dipped in the following bath at 40° C. for 5 min. for activation, washed with water, and further subjected to the chemical nickel-plating and electroplating of Example 2.

The resultant products had smooth surfaces and beautiful metallic luster, and showed no blisters of samples throughout three cycles.

EXAMPLE 7

Polyester resin transistorized radio cabinets whose surfaces were roughened in the same manner as Example 2 were dipped in the following bath at 40° C. for 10 min. for activation, washed with water, and then subjected to the chemical nickel-plating and electroplating of Example 2.

The resultant products had smooth surfaces and beautiful metallic luster, showing a blister of one sample in the second cycle of the heating and cooling test.

What we claim is:

1. A process for preparing an activated polymer surface which consists essentially of contacting a clean non-active unconditioned polymer surface with a liquid activating composition containing at least one reactive conditioning agent in combination with at least one ion of a metal selected from the group consisting of platinum, palladium, silver and gold, wherein the reactive conditioning agent contains sulfuric acid and chromic acid and wherein the polymer surface contains acrylonitrile-butadiene-styrene terpolymer.

2. The process of claim 1 wherein the ion selected is palladium.

3. A process for preparing an activated polymer surface which consists essentially of contacting a clean non-active unconditioned polymer surface with a liquid activating composition containing at least one reactive conditioning agent in combination with at least one ion of a metal selected from the group consisting of platinum, palladium, silver and gold, wherein the reactive conditioning agent contains sulfuric acid and chromic acid.

4. A basis material bearing a polymer surface containing acrylonitrile-butadiene-styrene terpolymer wherein at least a portion of said polymer surface has been initially activated with an activating composition containing sulfuric acid and chromic acid in combination with at least one ion of a metal selected from the group consisting of platinum, palladium, silver and gold.

5. A basis material bearing a polymer surface wherein at least a portion of said polymer surface has been initially activated with an activating composition containing sulfuric acid and chromic acid in combination with at least one ion of a metal selected from the group consisting of platinum, palladium, silver and gold.

6. The material of claim 5 wherein the ion selected is palladium.

* * * * *